United States Patent
Bhatia et al.

(10) Patent No.: US 9,307,428 B2
(45) Date of Patent: Apr. 5, 2016

(54) ESTIMATING AVAILABLE CELL CAPACITY BASED ON MONITORED NETWORK DATA

(71) Applicant: Alcatel-Lucent USA Inc., Murray Hill, NJ (US)

(72) Inventors: Randeep S. Bhatia, Green Brook, NJ (US); Bhawna Gupta, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 159 days.

(21) Appl. No.: 14/149,404

(22) Filed: Jan. 7, 2014

(65) Prior Publication Data
US 2015/0195726 A1 Jul. 9, 2015

(51) Int. Cl.
*H04B 17/00* (2015.01)
*H04W 24/08* (2009.01)

(52) U.S. Cl.
CPC ............... *H04W 24/08* (2013.01)

(58) Field of Classification Search
USPC ............... 455/500, 67.11; 370/328
See application file for complete search history.

(56) References Cited

U.S. PATENT DOCUMENTS

| | | | |
|---|---|---|---|
| 2005/0220035 A1* | 10/2005 | Ling et al. | 370/252 |
| 2008/0176571 A1* | 7/2008 | Choi | 455/436 |
| 2012/0120824 A1* | 5/2012 | Meylan et al. | 370/252 |
| 2014/0334318 A1* | 11/2014 | Pica et al. | 370/252 |

* cited by examiner

*Primary Examiner* — Nguyen Vo
(74) *Attorney, Agent, or Firm* — Ryan, Mason & Lewis, LLP

(57) ABSTRACT

In one embodiment, a method comprises monitoring network data associated with a cell of a communication network for one or more channel conditions, estimating total cell capacities for respective channel conditions based on the monitored network data, and estimating an available cell capacity based at least in part on the total cell capacity estimates and a portion of the monitored network data. The method may also include sending information derived from at least a portion of the network data to a server and receiving from the server total cell capacities for respective channel conditions, where the total cell capacities received from the server are used to estimate the available cell capacity. The method may further include sending the available cell capacity estimate to the server and receiving from the server an available cell capacity.

20 Claims, 5 Drawing Sheets

ESTIMATING AVAILABLE CELL CAPACITY BASED ON MONITORED NETWORK DATA

FIELD

The field relates generally to communication networks, and more particularly to techniques for transmitting information in such networks.

BACKGROUND

In communication networks, load can vary significantly over time and channel conditions. This is particularly true in mobile cellular networks such as fourth generation Long Term Evolution (LTE) cellular networks, which are designed for handling consumer communication applications such as voice, video streaming, video conferencing, web browsing and file transfers. LTE networks and other conventional wireless networks such as IEEE 802.11n networks have mechanisms such as rate adaptation and scheduling for dynamically allocating resources to serve multiple users. In typical mobile cell sites, however, a significant portion of traffic is carried during peak times which include only a few hours of the day. As a result, almost 80% of cell capacity is unused for an average mobile cell site.

SUMMARY

Illustrative embodiments of the present invention provide for better utilization of network resources for traffic in mobile data networks with varying channel conditions. Similar advantages are provided in numerous other networks that are subject to varying channel conditions.

In one embodiment, a method comprises monitoring network data associated with a cell of a communication network for one or more channel conditions, estimating total cell capacities for respective channel conditions based on the monitored network data, and estimating an available cell capacity based at least in part on the total cell capacity estimates and a portion of the monitored network data. The method is performed by at least one processing device comprising a processor coupled to a memory.

In another embodiment, a method comprises receiving information derived from network data associated with a cell of a communication network for one or more channel conditions from one or more of a plurality of clients connected to the cell, determining a total cell capacity for respective channel conditions based at least in part on the received information, sending the total cell capacities for respective channel conditions to the plurality of clients, receiving available cell capacity estimates from one or more of the plurality of clients connected to the cell, determining an available cell capacity based at least in part on the received available cell capacity estimates, and sending the available cell capacity to the plurality of clients. The method is performed by at least one processing device comprising a processor coupled to a memory.

DETAILED DESCRIPTION

Figure 1:
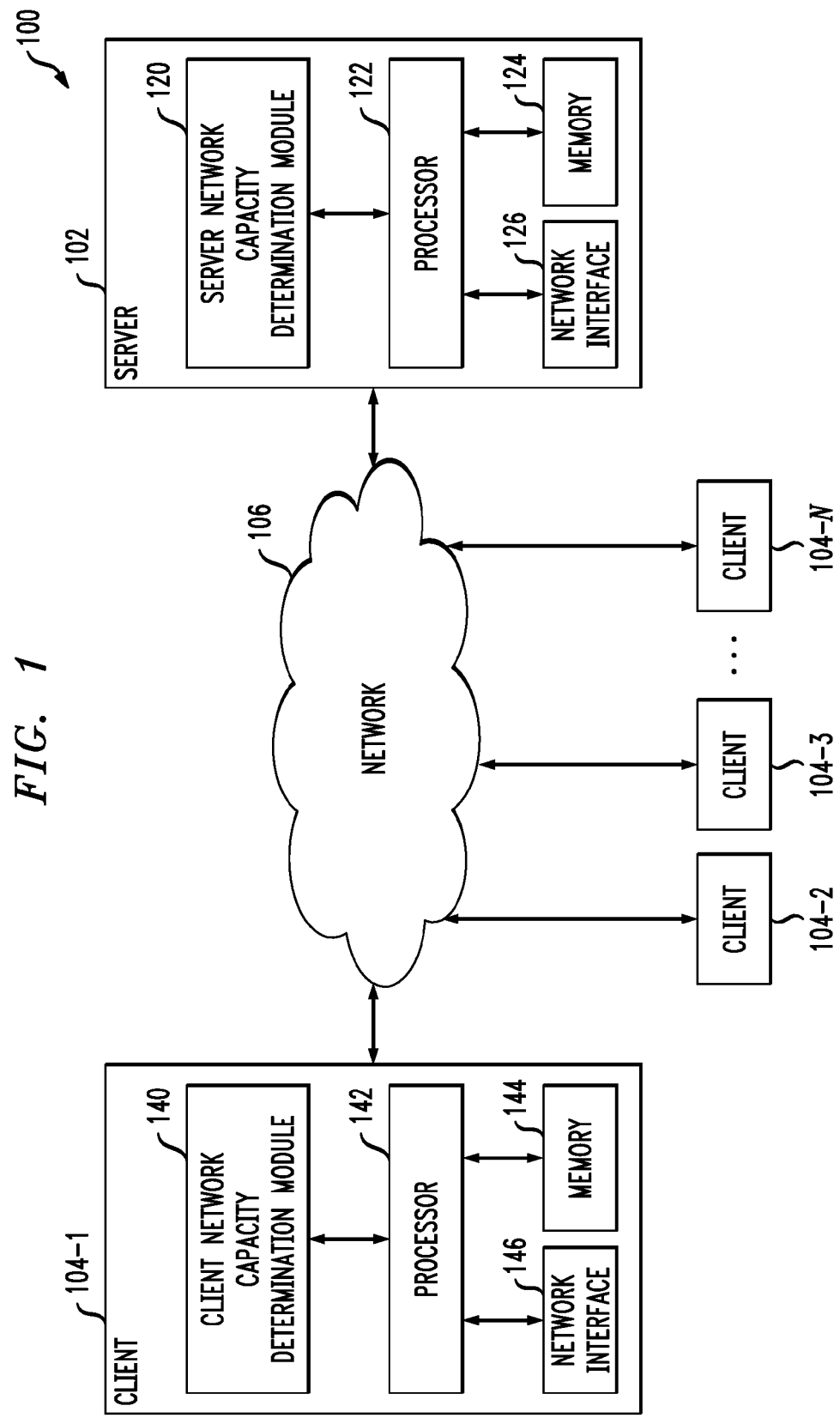
FIG. 1 shows a communication system in an illustrative embodiment of the invention.

Illustrative embodiments of the invention will be described herein with reference to exemplary communication networks, clients, servers and associated communication modes and channels. It should be understood, however, that the invention is not limited to use with the particular arrangements described, but is instead more generally applicable to any communication network application in which it is desirable to provide improved performance under varying channel conditions.

As described above, the load for communication networks such as mobile or cellular networks can vary significantly over time and channel conditions. Thus, there is a growing need for scalable monitoring systems capable of real-time congestion detection in large mobile networks as well as rapid dissemination of changes in network state to a large number of clients.

Also as described above, most of the traffic for a typical mobile cell site is carried during only a few hours of the day resulting in almost 80% of cell capacity being unused on average. Thus, potentially 5 times capacity gains are possible without adding extra capacity by tapping into this surplus or unused capacity. Identifying and leveraging the surplus or unused capacity, however, is challenging due to the highly dynamic and unpredictable nature of data traffic resulting in fast and dynamic changes in network load.

Historically, voice has dominated data traffic in mobile networks. For voice, the busy hours are quite predictable, e.g., voice traffic is observed to happen mainly in the morning or evening rush hours. With the rise of smartphones and faster mobile networks, however, data traffic is beginning to dwarf voice traffic. Unlike voice traffic, data traffic can be bursty, particularly at the radio access network (RAN) side of a mobile network. As a result, even during times of peak usage there is a high variation in cell loading that happens at the granularity of minutes. Thus, there are often times even during busy hours when a cell is lightly loaded and there is surplus capacity. Considerable efficiencies can be achieved by making use of such surplus capacity available throughout the day.

Embodiments of the invention provide techniques for dynamically and rapidly detecting changes in network load in real time. Embodiments identify surplus or available capacity, or detect congestion and rapidly make this information available to a large number of clients without adding significant signaling and data overhead to the network. Embodiments, as will be described in further detail below, can offer discounts to users or trigger content download or updates when surplus capacity becomes available.

Conventional techniques for congestion detection are not very well suited for the dynamic and unpredictable nature of data traffic. For example, the use of statically determined peak and off-peak times is used to reduce network congestion. Data traffic, however, not only varies from time to time but also varies from location to location. For instance, different cells within the same network can exhibit very different network usage patterns. Even for a single cell, data usage patterns do not remain static over time. Instead, data usage patterns continually evolve as more and more data users begin to use an increased variety of mobile devices and applications. Dynamic congestion detection and rapid response to changes in network load are important functions that are missing from or not adequately addressed by conventional techniques.

The term "cell" as used herein refers to a particular coverage area of a network. A cell may refer to a particular geographic area. In some embodiments, a cell is the geographic area covered by a base station (BTS) in a cellular or mobile network. In the context of a wireless network, such as an 802.11 wireless network, the cell is the geographic area covered by a particular router or access point for the network. Various other examples are possible for other types of mobile and wireless networks.

Conventional network monitoring systems also typically make an assumption that the available capacity can be determined as the difference of the capacity of a bottlenecked link to the offered load. However, in mobile networks this is not always the case as the capacity of a radio link is very much dependent on the channel quality of users and hence can be time varying. Thus, even if an observed load for a particular cell is low, the cell may still not have any or sufficient available capacity due to available network resources being assigned to users with poor channel quality.

Therefore, monitoring solutions should measure cell load in conjunction with the channel quality for users. On the network side, such monitoring is done from the BTS where both the user's channel quality and the allocated BTS resource usage can be monitored. While this can result in more accurate monitoring, it can be challenging to deploy for a number of reasons. For example, there is a significant cost and challenge associated with upgrading BTSs with many different proprietary interfaces. As another example, BTS-side monitoring increases cell or backhaul overhead in sending monitored data from BTSs to central policy control and enforcement engines. Such increased backhaul overhead also results in high delays in informing clients of changes in network load, thus slowing reaction time. In addition, rapidly distributing information to a large number of clients so that the clients can quickly react to changes in network load also involves high overhead.

On the client side, mobile devices themselves perform monitoring and policy enforcement locally. A combination of active and passive probing techniques can be used for monitoring local conditions such as the user's channel quality as well as estimating the global network state including cell congestion. Network availability can be estimated by passively monitoring the radio channel slot occupancy. This can be challenging, however, as it requires access to proprietary vendor-specific application programming interfaces (APIs) for the radio modem of the device.

Another client side approach is to use active probing. Active probing involves sending probe packets to estimate the available bandwidth. Active probing techniques have the advantage of being mostly independent of the device firmware, hardware, operating system, etc. Active probing, however, requires additional signaling and data overhead. Embodiments of the invention can overcome these and other drawbacks as will be detailed below.

FIG. 1 illustrates a communication system 100 in an illustrative embodiment of the invention. The communication system includes a server 102 and clients 104 connected to a network 106. The number N of clients connected to the network 106 may vary, as will be discussed in further detail below.

It is important to note that while FIG. 1 shows an embodiment including a server 102 and multiple clients 104, embodiments of the invention are not limited solely to this arrangement. As will be described in further detail below, in some embodiments a given client estimates the available cell capacity without receiving total cell capacities or other information from the server 102. For example, a given client can use monitored network data to estimate total cell capacities for respective channel conditions, and use such estimates for estimating the available cell capacity.

Server 102 comprises a server network capacity determination module 120, processor 122, memory 124 and network interface 126. The term "server" should be understood to encompass any type of processing device or set of such devices that is operative to perform functionality described herein with respect to server 102. A server may be implemented as a portion of a device that performs other functions, as a combination of multiple servers or other devices, or in other forms.

The client 104-1 comprises a client network capacity determination module 140, processor 142, memory 144 and network interface 146. Although not explicitly shown in FIG. 1, clients 104-2, 104-3, . . . , 104-N similarly comprise respective client network capacity determination modules, processors, memories and network interfaces. The clients 104 in FIG. 1 are examples of processing devices. Such processing devices include user interface devices such as cellular phones, tablets, laptops, smart watches, and various other mobile computing devices. Processing devices can also include desktop computing devices and lightweight computing devices such as radio frequency identification (RFID) tags, The server network capacity determination module 120 and the client network capacity determination module 140 comprise functional modules which are implemented via hardware, software or a combination of hardware and software to provide functionality to be described below.

The processors 122 and 142 of server 102 and client 104-1, respectively, may each be implemented utilizing a microprocessor, a microcontroller, an application-specific integrated circuit (ASIC), a field-programmable gate array (FPGA), or other type of processing circuitry, as well as portions or combinations of such processing circuitry. A given such processor may include one or more embedded memories as internal memories.

The processor 122 or 142 and any associated internal or external memory may be used in storage and execution of one or more software programs for controlling the operation of the corresponding server 102 or client 104-1. Accordingly, the server network capacity determination module 120, the client network capacity determination module 140, or portions of these modules, may be implemented at least in part using such software programs.

Each of the memories 124 and 144 of the respective server 102 and client 104-1 is assumed to include one or more storage areas that may be utilized for program code storage. The memory 124 or 144 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. Articles of manufacture comprising such computer program products or other computer-readable storage media are considered embodiments of the invention. The term "article of manufacture" as used herein should be understood to exclude transitory, propagating signals.

The memory 124 or 144 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The server 102 and client 104-1 also include respective network interfaces 126 and 146, which allow the server 102 and client 104-1 to communicate with one another via network 106. The network interfaces 126 and 146 comprise transceiver circuitry which will generally include conventional transceivers as well as other related circuitry used to support communication over the network 106.

The network 106 may comprise, for example, a cellular or other mobile or wireless network. The term "network" as used herein, however, is intended to be broadly construed and may include global computer networks such as the Internet, a wide area network (WAN), a local area network (LAN), a satellite network, a telephone or cable network, a cellular network, a wireless network such as Wi-Fi or WiMAX, or various portions or combinations of these and other types of networks.

It is to be appreciated that the particular arrangement of components shown in FIG. 1 is exemplary only, and numerous alternative configurations may be used in other embodiments. For example, the server 102 or client 104-1 can be configured to incorporate additional or alternative components and to support other communication protocols.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Embodiments of the invention provide techniques for efficiently detecting and distributing network congestion information. Clients, such as the clients 104 in system 100, can utilize active or passive probing mechanisms to allow the client to sample the available bandwidth. The available bandwidth is determined based on a number of different parameters. For example, a client can measure download throughput for determining available bandwidth.

The throughput parameter by itself, however, may not always be enough or sufficient for obtaining an accurate estimate of available cell capacity. This is because, in wireless networks such as cellular networks, the throughput depends not only on the available capacity or wireless technology of the cell, but also on the channel quality for a particular client. Even with only one client connected to a cell, the download throughput may be low if the client has poor channel quality. Thus, the client's estimation of available cell capacity based solely on observed download throughput may not be accurate.

As such, embodiments also monitor parameters indicative of a total cell capacity. The term "total cell capacity" as used herein does not necessarily mean the absolute maximum capacity for a given cell. Instead, the term total cell capacity is intended to refer to a measure which is indicative of, but not necessarily equal to, the maximum throughput for respective channel conditions for a given cell. In some embodiments, the total cell capacity measure is based on a confidence level (e.g., 90% or 95%) of observed parameters indicative of the maximum possible throughput. For example, a total cell capacity measure can exclude certain outliers in monitored data which correspond to temporary bursts of cell capacity that are not truly indicative of the maximum possible throughput for the given cell. In other embodiments, the total cell capacity is alternatively or additionally based on statistical analysis of monitored parameters, and includes a given value as well as a standard deviation. The total cell capacity for a given channel quality or channel condition varies from cell to cell based on the RAN technology of the cell, frequency, number of carriers, etc.

Embodiments below distinguish between "estimates" of total cell capacities and the total cell capacities, as well as between "estimates" of the available cell capacity and the available cell capacity, solely for clarity of illustration. In the embodiments described below, an "estimate" is used to refer to the calculation, computation or determination of total cell capacity or available cell capacity by a client. Calculations, computations or determinations by a server are distinguished therefrom and referred to simply as total cell capacities or the available cell capacity. This does not mean, however, that the calculation, computation or determination by a server is necessarily the "actual" total cell capacity for a given channel condition or the "actual" available cell capacity. Instead, the total cell capacities and available cell capacities calculated, computed or otherwise determined by the server are also estimates. Generally, the estimates of the server will be more accurate than the estimates of any particular client selected at random since, as will be detailed below, the server has access to estimates from a number of clients.

Clients, as discussed above, use download throughput as one parameter for determining an estimate of the available cell capacity. Download throughput, however, depends on the number of clients or other users connected to the cell, as well as the level of sharing in the cell. BTSs, such as an Evolved Node B (eNodeB) in an evolved Universal Mobile Telecommunications System (UMTS) Terrestrial Radio Access (E-UTRA) LTE network, use proportionally fair scheduling to divide radio resources fairly and evenly between active users attached to a cell.

In some embodiments of the invention, clients estimate available capacity for a cell as follows. First, clients monitor network data associated with the cell. The network data includes historic data about channel conditions as measured by parameters such as the Signal to Noise Ratio (SNR), Received Signal Strength Indication (RSSI) with observed throughput, etc. Clients use the monitored network data to determine an estimate of the total cell capacity for particular channel conditions. In some embodiments, this involves a client such as client 104-1 sending information derived from at least a portion of the monitored network data to the server 102, and receiving from the server 102 the total cell capacities for respective channel conditions. In other embodiments, the client 104-1 need not send data to or receive total cell capacities from the server 102.

In addition to monitoring network data, the clients 104 also monitor data transfers to determine throughput. Clients 104 locally track the observed throughput for different channel conditions within each cell that they connect to. Updates on the observed throughput per channel quality are sent to the server 102 along with the monitored network data, or some information derived from the network data and observed throughput to reduce overhead for transmissions between the clients 104 and server 102.

The server 102 aggregates network data, or information derived therefrom, which is received from various ones of the clients 104 so as to determine the total cell capacities. The monitored network data and other measurements by individual clients can be aggregated by the server 102 to obtain a more complete view of channel conditions in the cell, and thus more accurate estimations of the total cell capacities. The server 102 makes the total cell capacities for various channel conditions available to the clients 104. A client which connects to a new cell communicates with the server 102 so as to obtain the current total cell capacities for one or more channel conditions.

To estimate available cell capacity the clients measure download throughput and channel conditions over a sequence of time windows in real time. The total cell capacity for a given channel condition in a given time window is based on the number of active cell users during the time window. For example, under proportional scheduling used in cellular networks, the user's throughput for a given time window is the total cell capacity for the current channel condition divided by the number of active users during the given time window. The time windows are designed to be short enough such that within each time window, there is either no data transfer from any other user of the cell or the cell capacity is fully utilized from such data transfers. In some embodiments, the time windows vary in length between one and ten seconds. The length of the time windows can be determined by usage patterns for the cell, historical data, etc. Trial and error may be used to select a time window length which achieves a desired tradeoff between computational resources consumed and accuracy.

Figure 2:
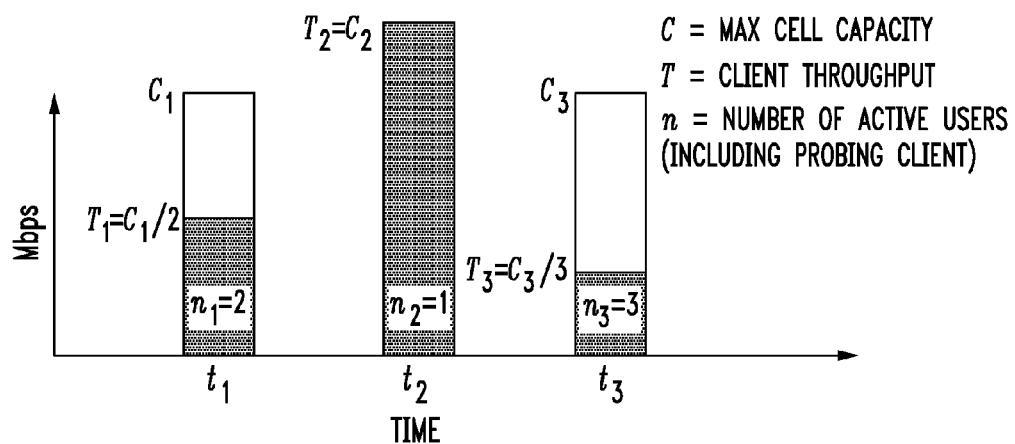
FIG. 2 is a chart illustrating cell capacity, according to an illustrative embodiment of the invention.

FIG. 2 illustrates a plot of the observed throughput for clients in time windows $t_1$, $t_2$ and $t_3$. In time window $t_1$, n is equal to 2. Thus, the throughput T for each client in time window $t_1$ is $T_1 = C_1/2$, for the total cell capacity $C_1$ for the channel condition observed by the client during time window $t_1$. In time window $t_2$, n is equal to 1 and thus the throughput for the client in time window $t_2$ is $T_2 = C_2$ for the total cell capacity $C_2$ for the channel condition observed by the client during time window $t_2$. In time window $t_3$, n is equal to 3 and thus the throughput for the client in time window $t_3$ is $T_3 = C_3/3$ for the total cell capacity $C_3$ for the channel condition observed by the client during time window $t_3$.

In some embodiments, a client calculates the available cell capacity as follows. For a sequence of time windows $t_1$, $t_2$, ..., $t_k$, let the observed throughput by a client be $B_1$, $B_2$, ..., $B_k$. For each of the time windows $t_1$, $t_2$, ..., $t_k$, let the total cell capacity for the current channel condition be $C_1$, $C_2$, ..., $C_k$. In embodiments where the client does not communicate with a server, $C_1$, $C_2$, ..., $C_k$ would represent the total cell capacities estimated at the client. The average available cell capacity over the time period spanning these k time windows is estimated as $$\frac{l}{k},$$

where $l \leq k$ is the number of time windows in which $B_i \geq f(C_i)$ for some function $f$. In some embodiments, the function $f$ is $C_i/2$, e.g., the number of time windows in which $B_i$ is equal to or exceeds half of the total cell capacity for the current channel condition. This is because in such time windows there is no other active user, otherwise the throughput would be at most $C_i/2$. This fraction, $$\frac{l}{k},$$

is a predictor of the capacity available in the cell for a subsequent time period.

In some embodiments, the available cell capacity estimate of the client is compared to a cell-specific available capacity threshold τ. The available cell capacity is determined to be available only if the available cell capacity estimate is greater than or equal to the cell-specific available capacity threshold τ.

Probing mechanisms used in embodiments of the invention include active and/or passive probing techniques. Active probing techniques involve a user occasionally downloading data from the network. Probing mechanisms used in embodiments of the invention, however, need not operate independent of user data transfers. Passive probing techniques use existing user data transfers for determining total cell capacity and available cell capacity estimates. In some embodiments, existing data transfers are utilized as an alternative to or supplement to active probing for determining throughput in various time windows in the manner described above. The client can act as a proxy for user applications running on a processing device to monitor the capacity availability as user applications transfer data in the network. Thus, probing in some embodiments does not require any additional data transfers so long as there is data activity from user applications running on a client processing device such that passive probing may be performed. This helps to mitigate the additional overhead involved in active probing techniques.

In some situations, a user is not currently engaged in data activity, e.g., there are no user applications running on the processing device which are currently transferring data in the network. In these situations, a background user application monitors congestion information in order to resume a content download at an appropriate time. As described above, network congestion estimates, such as the available cell capacity estimates, are utilized to schedule background data tasks such as application updates, data synching, system updates, etc. The background application may run on a client processing device so as to schedule such data transfer tasks when the cell capacity is underutilized.

To minimize the impact of active probing to monitor network congestion, clients 104 in some embodiments perform active probing in accordance with a schedule. The schedule appropriately spaces out active probing activities for a given client while still ensuring that capacity availability can be detected in a timely fashion. In some embodiments, the server 102 determines and distributes a schedule for active probing to the clients 104. The schedule is designed to ensure that only a small number of the clients 104 perform active probing at any given time.

In some embodiments, the server 102 dynamically selects a small set of the clients 104 within each cell for active probing. For example, server 102 may schedule only a few (e.g., 2-3) or some percentage (e.g., less than 5% of clients connected to the cell) to perform active probing at a given time. It is important to note that the specific number of clients scheduled for active probing may be altered or selected based on a given network arrangement. In some embodiments, more than 2-3 clients are scheduled for active probing at a given time, or only a single client is scheduled for active probing at a given time. Similarly, the specific percentage of clients scheduled for active proving at a given time may be adjusted. Thus, the specific numbers provided above are presented by way of example only.

Scheduling the small set of clients 104 within each cell for active probing ensures low signaling and data overhead resulting from active probing. As the small set of clients track changes in cell congestion, they report such changes to the server 102. The server 102 in turn notifies other clients in the cell who need updates on changes in cell congestion but are not themselves monitoring congestion. Different subsets of the clients connected to each cell are selected for active probing during different time periods to keep the probing load spread across the clients to minimize battery drain from active probing or to free up processing and memory resources used for active probing.

Figure 3:
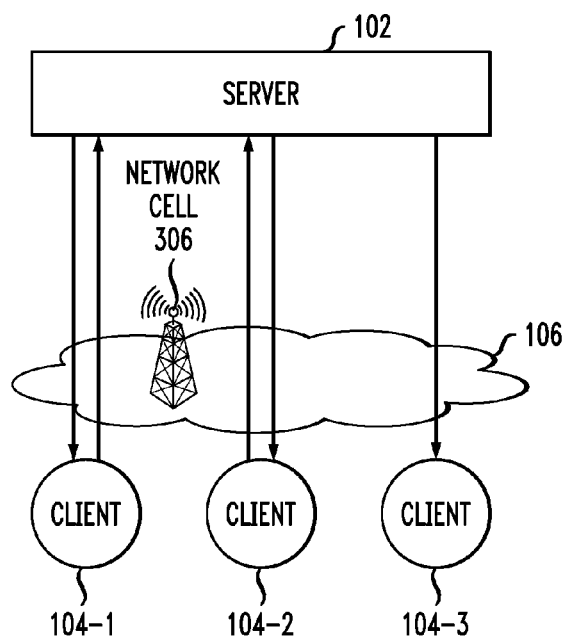
FIG. 3 is a more detailed view of a portion of the communication system in FIG. 1, according to an illustrative embodiment of the invention.

FIG. 3 is a detailed view of a portion of the communication system 100. FIG. 3 shows a network cell 306 of the network 106. The clients 104-1, 104-2 and 104-3 are connected to the network cell 306 of the network 106. The server 102 is also connected to the network cell 306. It is important to note, however, that embodiments are not limited solely to arrangements in which server 102 is connected to the same network cell 306 as the clients 104-1, 104-2, and 104-3. Instead, the server 102 may be connected to a different network cell. In some embodiments, the server 102 communicates with groups of clients connected to different network cells. Information regarding network congestion for a given cell is distributed to the groups of clients connected to the given cell.

In FIG. 3, clients 104-1 and 104-2 are actively probing the network cell 306, and reporting estimates of the available capacity for network cell 306 to the server 102. The server 102, as discussed above, may dynamically select and schedule the particular ones of the clients 104 which are actively probing the network cell 306 at a given time. Client 104-3 is not actively probing the network cell 306. Instead, the client 104-3 receives the available capacity for network cell 306 from the server 102.

Figure 4:
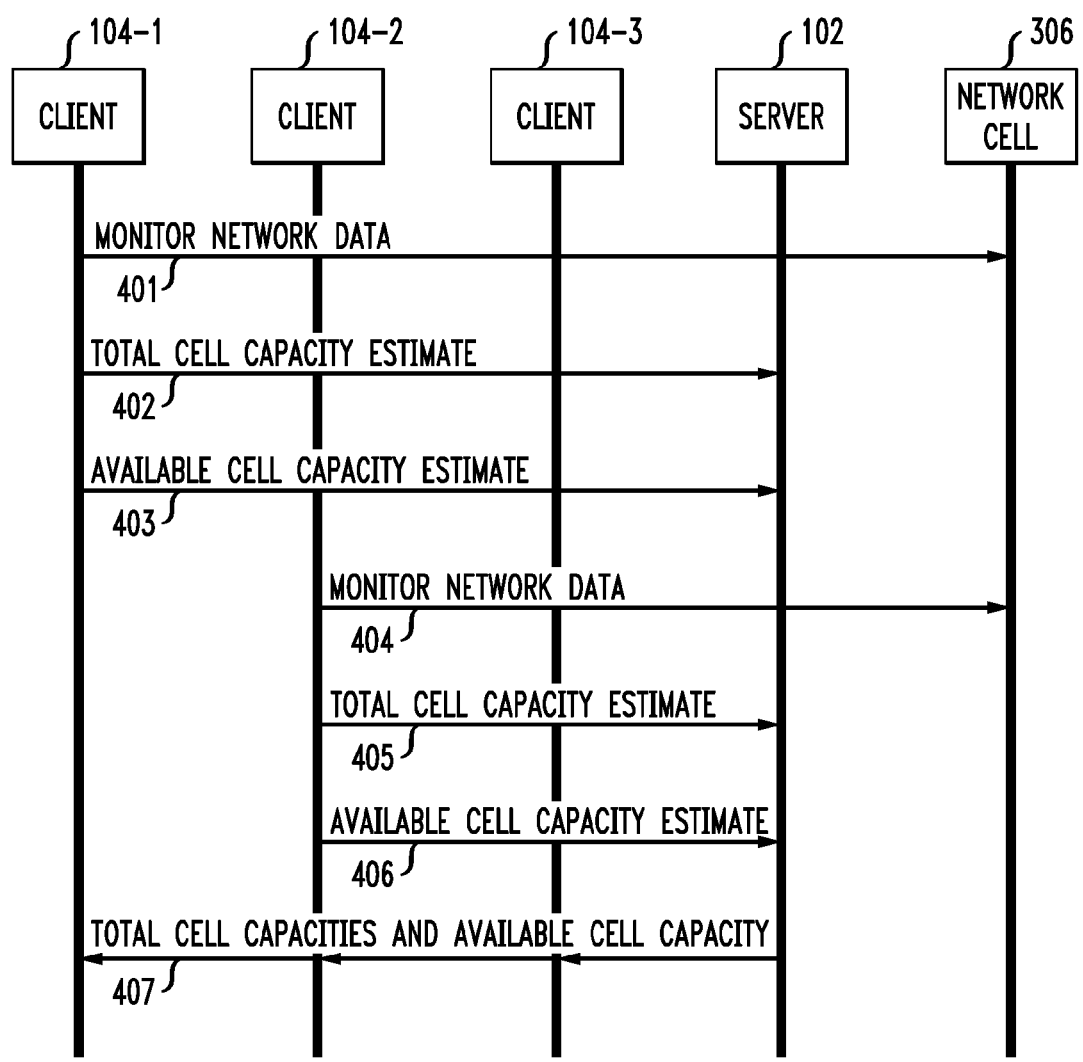
FIG. 4 illustrates communications between elements in the portion of the communication system shown in FIG. 3, according to an illustrative embodiment of the invention.

FIG. 4 illustrates communications between elements in the portion of the communication system 100 shown in FIG. 3. In step 401, the client 104-1 monitors network data. As discussed above, the network data may comprise observed throughput as well as one or more parameters indicative of respective channel conditions. Using the monitored network data, client 104-1 determines an estimate of the total cell capacity for respective channel conditions. This estimate is an example of information which is derived from the monitored network data. The estimate of the total cell capacity may be obtained by applying a function to at least a portion of the monitored network data. In step 402, the client 104-1 provides estimates of total cell capacity for one or more channel conditions to the server 102. The client 104-1 also estimates the available cell capacity. The client 104-1 may use one of or a combination of the techniques described above for computing the available cell capacity estimate. In step 403, the client 104-1 provides the available cell capacity estimate to the server 102. Steps 404-406 are similar to those of steps 401-401, respectively, but are performed by client 104-2.

In step 407, the server 102 provides total cell capacities for respective channel conditions and the available cell capacity to clients 104-1, 104-2 and 104-3. Although described above as occurring in a sequential manner, the steps 401-407 need not be performed in the order shown in FIG. 4. Instead, various steps may be performed substantially simultaneously, or in a different order altogether. For example, clients 104-1 and 104-2 may perform steps 401 and 404 concurrently. Similarly, steps 402, 403, 405 and 406 may be performed concurrently.

As another example, step 407 may occur before steps 402, 403, 405 and 406, or in some cases before all of steps 401-406. The server 102 may provide total cell capacities and available cell capacities to clients 104-1, 104-2 and 104-3 before clients 104-1 and 104-2 begin the active probing process. The total cell capacities and available cell capacities may be based on active probing by clients not shown in FIG. 2 or 3 (e.g., some subset of the N clients connected to network cell 306 may have been selected for active probing at a time period before clients 104-1 and 104-2 were selected).

In some embodiments, the server 102 provides the total cell capacities and available cell capacities to the clients 104-1, 104-2 and 104-3 at different times, rather than in a single step as shown in FIG. 4. For example, the server 102 provides total cell capacities to the clients 104 after receiving total cell capacity estimates from respective ones of the clients 104, or after the server 102 has received a sufficient number of total cell capacity estimates from various ones of the clients 104 so as to calculate the total cell capacity with a particular confidence level. Similarly, the server 102 may provide the available cell capacity to the clients 104 after it has received a sufficient number of available cell capacity estimates such that the server 102 is able to calculate the available cell capacity with a particular confidence level.

In addition, while FIG. 4 shows the server 102 transmitting the total cell capacities and available cell capacities to the clients 104-1, 104-2 and 104-3 at the same time, embodiments are not limited solely to this arrangement. In some embodiments, communication of the total cell capacities and the available cell capacity to a number of the clients 104 is done at the same time to reduce signaling and overhead. In other embodiments, unicast or point-to-point transmission of such information is used.

For example, the server 102 may schedule broadcast or multicast messages of total cell capacities and available cell capacities at defined intervals. The defined time intervals may be periodic (e.g. every x minutes) or based on other criteria. To reduce signaling and overhead, the server 102 in some embodiments broadcasts a communication with total cell capacities and available cell capacities when such capacities have changed by a particular amount. For example, the server may not send out a new broadcast message until the capacities have changed by 5%, 10%, or some other threshold chosen for a particular embodiment.

In other embodiments, the server 102 broadcasts a communication with updated total cell capacities and/or available cell capacities when the particular set of clients connected to a given network cell has changed by certain amount. For example, if 10% of the clients connected to the network cell 306 are different than the clients connected to the network cell during the previous broadcast message, a new broadcast message may be sent. As will be appreciated, the particular numbers and thresholds are presented above by way of example. These thresholds are altered in other embodiments based on the particular system configuration as well as current network congestion levels. For instance, during periods of high network congestion the server 102 may send less frequent updates of total cell capacities and the available cell capacity to reduce overhead.

In other embodiments, the server 102 sends a point-to-point or unicast message to a particular one of the clients 104 with total cell capacity or available cell capacity information. For example, if one of the clients 104 has just connected to the network cell 306, then the server 102 may send a message to that client with the total cell capacities and available cell capacity. As another example, the server 102 may send a point-to-point or unicast message to a given one of the clients 104 in response to an explicit request from the given client.

It is also important to note that, in some embodiments, the server 102 need not necessarily provide an available cell capacity to the clients 104. Instead, each client 104 may simply use its own available cell capacity estimate. In some embodiments a client determines whether to use its own estimate of the available cell capacity in place of the available cell capacity provided by the server 102. While the available cell capacity calculated by the server 102 may be more accurate than the estimate of any given one of the clients since the server 102 is able to aggregate estimates from the various clients, the available cell capacity calculated by the server 102 may not be as fresh or current as the available cell capacity estimate computed by a given client. Thus, in some embodiments clients compare a time at which the available cell capacity was received from the server 102 with the time at which the client estimated the available cell capacity. Based on the currency of the available cell capacity from the server 102, a client determines whether to use its own estimate or the available cell capacity received from the server 102. By way of example, a given client may use the length of time windows as discussed above to determine the currency of the available cell capacity received from the server 102.

Figure 5:
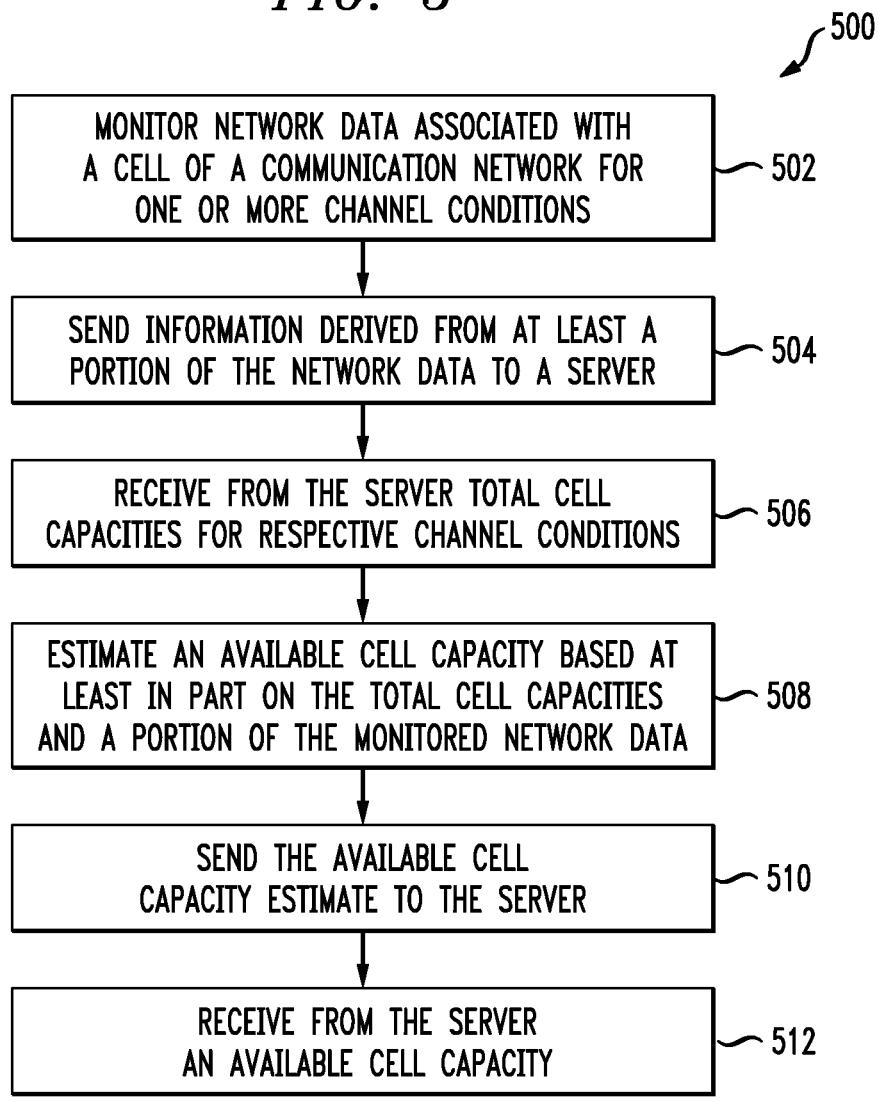
FIG. 5 is a flow diagram of a process carried out by a client in the communication system of FIG. 1, according to an illustrative embodiment of the invention.

FIG. 5 illustrates a method 500 carried out by a client in the communication system 100. The method 500 begins with step 502, monitoring network data associated with a cell of a communication network for one or more channel conditions. Next, the client sends 504 information derived from at least a portion of the network data to server 102. As discussed above, the information derived from at least a portion of the network data may be some subset of the network data, an estimate of the total cell capacity for one or more channel conditions computed by the client, etc.

In step 506, the client receives from the server 102 total cell capacities for respective channel conditions. The total cell capacity for a first channel condition may be different than the total cell capacity for a second channel condition. For example, the particular location of a device within a cell may affect the total cell capacity. In step 508, the client estimates an available cell capacity based at least in part on the total cell capacities and a portion of the monitored network data. As discussed above, the available cell capacity may be estimated by comparing the observed throughput for one or more time windows with the respective total cell capacities for channel conditions associated with those time windows.

The client sends 510 the available cell capacity estimate to the server 102, and receives 512 from the server 102 the available cell capacity computed by the server 102. In some embodiments, the server 102 aggregates available cell capacity estimates from a number of clients and calculates the available cell capacity based on these estimates. The server 102 can calculate the available cell capacity using a number of techniques, including statistical techniques such as calculating the average or median of the received estimates.

Figure 6:
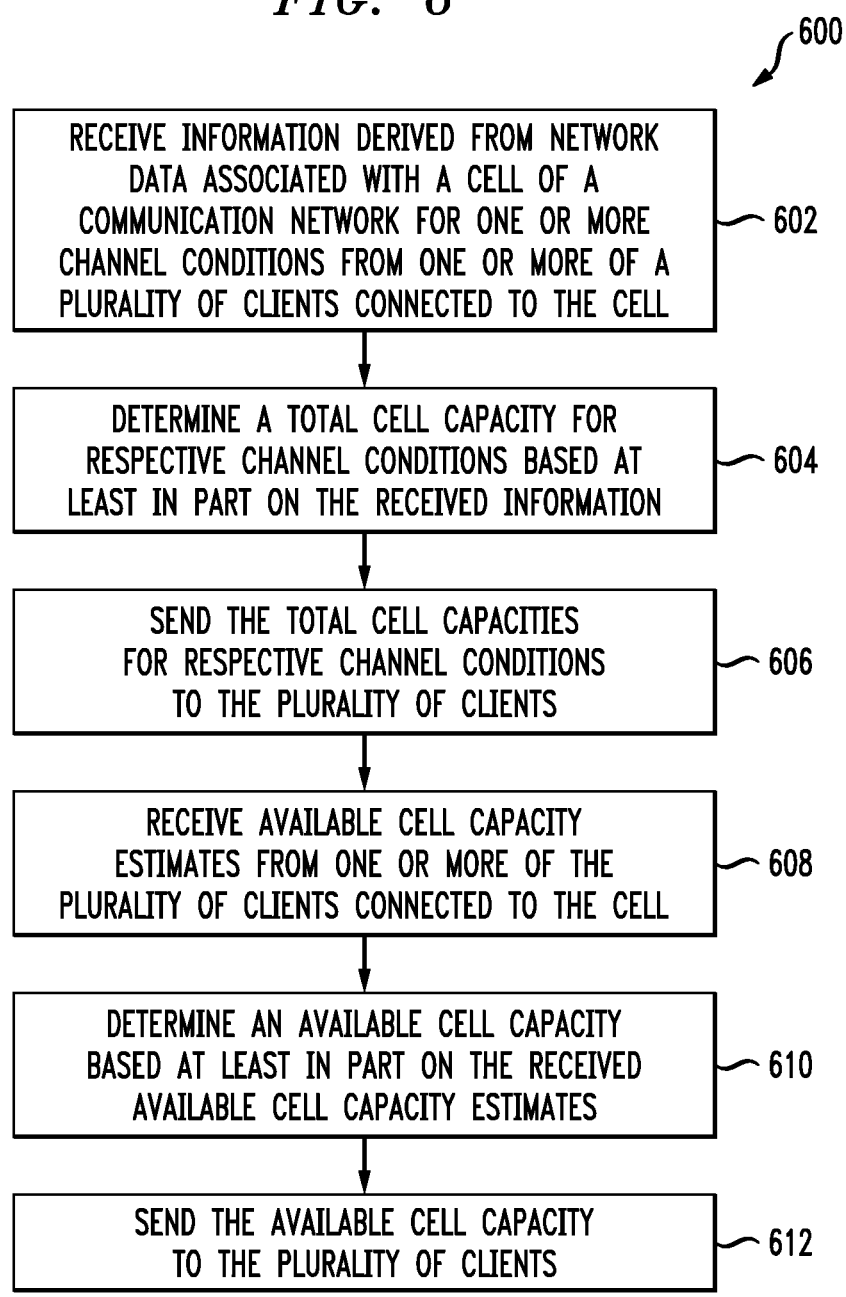
FIG. 6 is a flow diagram of a process carried out by a server in the communication system of FIG. 1, according to an illustrative embodiment of the invention.

FIG. 6 illustrates a method 600 carried out by the server 102 in the communication system 100. The method 600 begins with step 602, receiving information derived from network data associated with a cell of a communication network for one or more channel conditions from one or more of a plurality of clients connected to the cell. As discussed above with respect to FIG. 3, in some embodiments only a small subset of the clients, such as clients 104-1 and 104-2, are actively probing the cell at a given time. Thus, the server 102 does not necessarily receive network data, or information derived therefrom, from every client connected to a cell.

In addition, clients do not have to continuously transmit network data to the server. Instead, clients may calculate estimates of total cell capacities and send such estimates to the server periodically or in batches to reduce signaling and overhead. For example, a client may wait until a certain portion of the estimates have changed in order to send information to the server 102. Alternatively, a client may send network data and/or estimates of total cell capacity on a schedule, e.g., once a day, once a week, etc. Total cell capacity may not change as often or as drastically as available cell capacity, and thus to reduce signaling and overhead, the estimates of total cell capacity may be sent to a server less frequently than estimates of the available cell capacity.

In step 604, the server 102 determines a total cell capacity for respective channel conditions based at least in part on the information received in step 602. As detailed above, the total cell capacity for a first channel condition may be different than the total cell capacity for a second channel condition. The server 102 sends 606 the total cell capacities for the respective channel conditions to the plurality of clients. In some embodiments, the server 102 does not send the total cell capacities to every one of the plurality of clients connected to a cell. For example, not every client or processing device that is connected to a cell is part of the network congestion monitoring system. The plurality of clients may include only those clients which have subscribed to the network congestion monitoring system provided by the server 102.

The server 102 receives 608 available cell capacity estimates from one or more of the plurality of clients connected to the cell. The server 102 may schedule different subsets of the plurality of clients to actively probe the cell of the network at a given time. Thus, the server 102 will generally receive available cell capacity estimates from only a few of the plurality of clients connected to a cell. Embodiments, however, are not limited solely to this arrangement. For example, as the number of clients connected to a cell decrease, the relative proportion of clients that are actively probing the cell may increase. In the FIG. 3 example, for instance, two out of the three clients are actively probing the network cell 306.

In step 610, the server 102 determines an available cell capacity based at least in part on the available cell capacity estimates received in step 608. The server 102 then sends 612 the available cell capacity to the plurality of clients.

Similar to FIG. 4 above, embodiments are not limited solely to the particular ordering of steps shown in the methods 500 and 600 in FIGS. 5 and 6. Certain steps may be rearranged or performed concurrently. In addition, although not explicitly shown, certain steps may be repeated. For example, the server 102 may repeat step 606 and/or step 612 at defined time intervals as described above. In some embodiments, some of the steps in the methods 500 and 600 may be omitted. For example, in embodiments where a client does not communicate with a server, certain steps in the method 500 such as steps 510 and 512 are not required.

It should again be emphasized that the embodiments described above are for purposes of illustration only, and should not be interpreted as limiting in any way. Other embodiments may use different types of network, device and module configurations, and alternative communication protocols, process steps and operations for implementing network congestion monitoring functionality. The particular manner in which total cell capacities and available cell capacities, as well as estimates thereof, are computed can be varied in different embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising:
monitoring network data associated with a cell of a communication network for one or more channel conditions;
estimating total cell capacities for respective channel conditions based on the monitored network data;
sending information derived from at least a portion of the monitored network data to a server;
receiving from the server total cell capacities for respective channel conditions; and
estimating an available cell capacity based at least in part on the estimated total cell capacities, the portion of the monitored network data and the total cell capacities received from the server;
wherein the method is performed by at least one processing device comprising a processor coupled to a memory.

2. The method of claim 1, further comprising:
sending the estimated available cell capacity to the server; and
receiving from the server an available cell capacity.

3. The method of claim 1, wherein the network data comprises observed throughput and one or more parameters indicative of respective channel conditions, the one or more parameters comprising at least one of a signal to noise ratio and a received signal strength indication.

4. The method of claim 1, further comprising computing the estimate of the total cell capacity for a given channel condition by applying a function to at least a portion of the monitored network data.

5. The method of claim 1, wherein the estimated available cell capacity is compared to a cell-specific available capacity threshold, and wherein cell capacity is determined to be available for a given time period if the estimated available cell capacity is greater than or equal to the cell-specific available capacity threshold.

6. The method of claim 1, wherein monitoring network data comprises at least one of:
actively probing the cell; and
passively probing the cell utilizing existing data transfers for one or more applications running on the processing device.

7. The method of claim 1, wherein monitoring network data is performed on a schedule, the schedule being based at least in part on instructions received from the server.

8. The method of claim 1, wherein the communication network comprises a cellular network.

9. An article of manufacture comprising a processor-readable storage medium having embodied therein executable program code that when executed by the processing device causes the processing device to perform the method of claim 1.

10. A method comprising:
monitoring network data associated with a cell of a communication network for one or more channel conditions;
estimating total cell capacities for respective channel conditions based on the monitored network data; and
estimating an available cell capacity based at least in part on the estimated total cell capacities and a portion of the monitored network data;
wherein the method is performed by at least one processing device comprising a processor coupled to a memory; and
wherein estimating the available cell capacity comprises:
measuring download throughput for a sequence of time windows;
determining a channel condition for each time window in the sequence; and
comparing the measured download throughput and the estimated total cell capacity associated with the determined channel condition for respective time windows to generate the estimated available cell capacity.

11. The method of claim 10, wherein for measured download throughputs $B_1, B_2, \ldots, B_k$ and estimated total cell capacities associated with the determined channel conditions $C_1, C_2, \ldots, C_k$ of respective time windows $t_1, t_2, \ldots, t_k$, the estimated available cell capacity comprises:

$$\frac{l}{k}$$

where $1 \le k$ and represents a number of time windows in which $B_i \ge f(C_i)$ for respective time windows $t_i$ and a function $f$.

12. The method of claim 11, wherein the function $f$ comprises $C_i/2$.

13. An apparatus comprising:
a processing device comprising a processor and a memory coupled to the processor, the processing device implementing a client configured to:
monitor network data associated with a cell of a communication network for one or more channel conditions;
estimate total cell capacities for respective channel conditions based on the monitored network data;
send information derived from at least a portion of the monitored network data to a server;
receive from the server total cell capacities for respective channel conditions; and
estimate an available cell capacity based at least in part on the estimated total cell capacities, the portion of the monitored network data and the total cell capacities received from the server.

14. The apparatus of claim 13, wherein the communication network comprises a cellular network and the processing device comprises a mobile computing device.

15. The apparatus of claim 13, wherein the client is configured to estimate the available cell capacity by:
measuring download throughput for a sequence of time windows;
determining a channel condition for each time window in the sequence; and
comparing the measured download throughput and the estimated total cell capacity associated with the determined channel condition for respective time windows to generate the estimated available cell capacity.

16. A method comprising:
receiving information derived from network data associated with a cell of a communication network for one or more channel conditions from one or more of a plurality of clients connected to the cell;
determining a total cell capacity for respective channel conditions based at least in part on the received information;
sending the total cell capacities for respective channel conditions to the plurality of clients;
receiving available cell capacity estimates from one or more of the plurality of clients connected to the cell;

determining an available cell capacity based at least in part on the received available cell capacity estimates; and sending the available cell capacity to the plurality of clients;

wherein the method is performed by at least one processing device comprising a processor coupled to a memory.

17. The method of claim 16, further comprising instructing the subset of clients to monitor network data associated with the cell in accordance with a schedule.

18. The method of claim 17, wherein the schedule instructs a first subset of the clients to monitor network data for a first period of time and instructs a second subset of the client to monitor network data for a second period of time, the second subset of clients including at least one client not in the first subset.

19. An article of manufacture comprising a processor-readable storage medium having embodied therein executable program code that when executed by the processing device causes the processing device to perform the method of claim 16.

20. An apparatus comprising:

a processing device comprising a processor and a memory coupled to the processor, the processing device implementing a server configured to:

receive information derived from network data associated with a cell of a communication network for one or more channel conditions from one or more of a plurality of clients connected to the cell;

determine a total cell capacity for respective channel conditions based at least in part on the received information;

send the total cell capacities for respective channel conditions to the plurality of clients;

receive available cell capacity estimates from one or more of the plurality of clients connected to the cell;

determine an available cell capacity based at least in part on the received available cell capacity estimates; and send the available cell capacity to the plurality of clients.

\* \* \* \* \*